(12) United States Patent
Chan et al.

(10) Patent No.: US 12,374,237 B2
(45) Date of Patent: Jul. 29, 2025

(54) EXTRACORPOREAL MEMBRANE OXYGENATION SIMULATOR

(71) Applicant: ECMO PRN LLC, San Francisco, CA (US)

(72) Inventors: Timothy Chan, San Francisco, CA (US); Jason Kiyoshi Chan, San Francisco, CA (US)

(73) Assignee: ECMO PRN LLC, San Francisco, CA (US)

( * ) Notice: Subject to any disclaimer, the term of this patent is extended or adjusted under 35 U.S.C. 154(b) by 350 days.

(21) Appl. No.: 17/209,128

(22) Filed: Mar. 22, 2021

(65) Prior Publication Data

US 2021/0295742 A1    Sep. 23, 2021

Related U.S. Application Data

(60) Provisional application No. 62/993,425, filed on Mar. 23, 2020.

(51) Int. Cl.
*G09B 23/30* (2006.01)
*G09B 23/28* (2006.01)

(52) U.S. Cl.
CPC ......... *G09B 23/303* (2013.01); *G09B 23/286* (2013.01)

(58) Field of Classification Search
CPC ....... G09B 23/28; G09B 23/30; G09B 23/303
See application file for complete search history.

(56) References Cited

U.S. PATENT DOCUMENTS

| 8,899,988 | B2 | 12/2014 | Rodriguez et al. | |
| 9,017,080 | B1* | 4/2015 | Placik | G09B 23/285 |
| | | | | 434/269 |
| 9,662,431 | B2 | 5/2017 | Franano et al. | |
| 2013/0192741 | A1* | 8/2013 | Trotta | B29C 39/021 |
| | | | | 264/294 |
| 2014/0099617 | A1 | 4/2014 | Tallman, Jr. | |
| 2014/0120505 | A1* | 5/2014 | Rios | G09B 23/285 |
| | | | | 434/219 |
| 2014/0377731 | A1* | 12/2014 | Conrad | G09B 23/303 |
| | | | | 434/268 |
| 2017/0330488 | A1* | 11/2017 | Kinsella | G09B 23/286 |

(Continued)

FOREIGN PATENT DOCUMENTS

| WO | WO-2015187616 A1 * | 12/2015 | ............ G09B 23/28 |
| WO | 2017127724 A1 | 7/2017 | |

(Continued)

OTHER PUBLICATIONS

International Preliminary Report on Patentability for International Application No. PCT/US2021/023536, dated Oct. 6, 2022, 6 pages.

(Continued)

*Primary Examiner* — Kurt Fernstrom
(74) *Attorney, Agent, or Firm* — Buchalter, a Professional Corporation

(57) ABSTRACT

Exemplary embodiments include systems and methods for simulating a medical procedure. The simulator may approximate a portion of the body including the vasculature for providing simulation of accessing the vasculature in the medical procedure. The simulator may therefore include any combination of pump(s), conduit(s), reservoir(s), valve(s), body material, coverings, etc.

20 Claims, 8 Drawing Sheets

(56) References Cited

U.S. PATENT DOCUMENTS

| | | | | |
|---|---|---|---|---|
| 2018/0301062 A1* | 10/2018 | Curtis | ................... | G09B 23/28 |
| 2019/0027064 A1* | 1/2019 | Nelson | ................... | G09B 23/30 |
| 2019/0056442 A1* | 2/2019 | Chen | ................. | G01R 29/0814 |
| 2019/0251869 A1 | 8/2019 | Alsalemi et al. | | |
| 2019/0333413 A1* | 10/2019 | Bauer | ................. | G09B 23/303 |
| 2019/0378436 A1* | 12/2019 | Krummenacher | ..... | G09B 23/30 |
| 2021/0043113 A1* | 2/2021 | Sadasivan | ............ | G09B 23/285 |
| 2021/0248925 A1 | 8/2021 | Damjanovic et al. | | |

FOREIGN PATENT DOCUMENTS

| | | | |
|---|---|---|---|
| WO | 2020043465 A1 | 3/2020 | |
| WO | 2021194997 A1 | 9/2021 | |

OTHER PUBLICATIONS

International Search Report and Written Opinion for International Application No. PCT/US2021/023536, dated Jul. 12, 2021, 7 pages.

\* cited by examiner

EXTRACORPOREAL MEMBRANE OXYGENATION SIMULATOR

PRIORITY

This application claims priority to U.S. Application No. 62/993,425, filed Mar. 22, 2020, which is incorporated by reference in its entirety into this application.

BACKGROUND

For some people, their heart and lungs are unable to provide adequate amounts of gas exchange (i.e., oxygen exchanged for carbon dioxide) to sustain life. Techniques to perform the gas exchange have been developed so that the exchange is performed outside of the body, i.e., in an "extracorporeal" manner. This gas exchange is more commonly known as "extracorporeal membrane oxygenation". Also known as "ECMO".

The technology for ECMO is largely derived from cardiopulmonary bypass, which provides short-term support with arrested native circulation. ECMO is used in adults and children for various reasons. For example, patients experiencing cardiac and respiratory failure, viral pneumonia, among other conditions may benefit from ECMO. ECMO works by removing the blood from the person's body, artificially removing the carbon dioxide, oxygenating red blood cells, and then returning the oxygenated blood back to the patient.

The procedure for initiating ECMO, however, is not well known even among medical professionals. There are currently no techniques or simulations for showing medical professionals how to properly insert cannulas percutaneously into the patient in order to couple the ECMO machine to a patient.

SUMMARY

Exemplary embodiments include systems and methods for simulating a medical procedure. The simulator may approximate a portion of the body including the vasculature for providing simulation of accessing the vasculature in the medical procedure. The simulator may therefore include any combination of pump(s), conduit(s), reservoir(s), valve(s), body material, coverings, etc.

Exemplary embodiments disclosed herein may relate to healthcare, training, simulations, modelling, recreation, and combinations thereof. Exemplary embodiments more particularly relate to a partial body simulator to use for modelling procedure and/or for training, and more specifically to an extracorporeal membrane oxygenation simulator.

Aspects of the disclosure include a simulator for simulating a patient with access points that mimic the artery and vein of a patient. Exemplary embodiments of the simulator may include any combination of benefits that mimic the actual experience of accessing the artery and veins of a living patient.

In an exemplary embodiments, the simulator may include an obstructed view of the actual artery and vein at the access points.

In an exemplary embodiment, the simulator may permit the use of ultrasound to assist in the insertion and access to the artery and vein. The simulator being configured to permit ultrasound visualization may be a feature by itself or may be combined with the configuration that the direct access to the artery and vein at the access points is physically visually obstructed.

In an exemplary embodiment, the simulator may include an artery, and/or vein that comprises pulsatility. Exemplary embodiments of the pulsatility may include a palpable (tactile) feel at the simulator surface, during insertion and access to the simulated artery and/or simulated vein, during the use of the ECMO machine, and combinations thereof. Exemplary embodiments of the pulsatility may approximate the response of a physical living body when the artery and/or vein is punctured during access. The pulsatility may approximate and permit training of the feel of a living physical body to locate the target access points, distinguish the access points, confirm access, and combinations thereof.

In an exemplary embodiment, the simulator may also provide a closed loop circulator system that may be coupled to an extracorporeal membrane oxygenation ("ECMO") machine such that the ECMO procedure may be performed on the simulator. Exemplary embodiments include methods of using the simulator according to embodiments described herein in an ECMO procedure and/or in combination with an ECMO machine.

DRAWINGS

Figure 1:
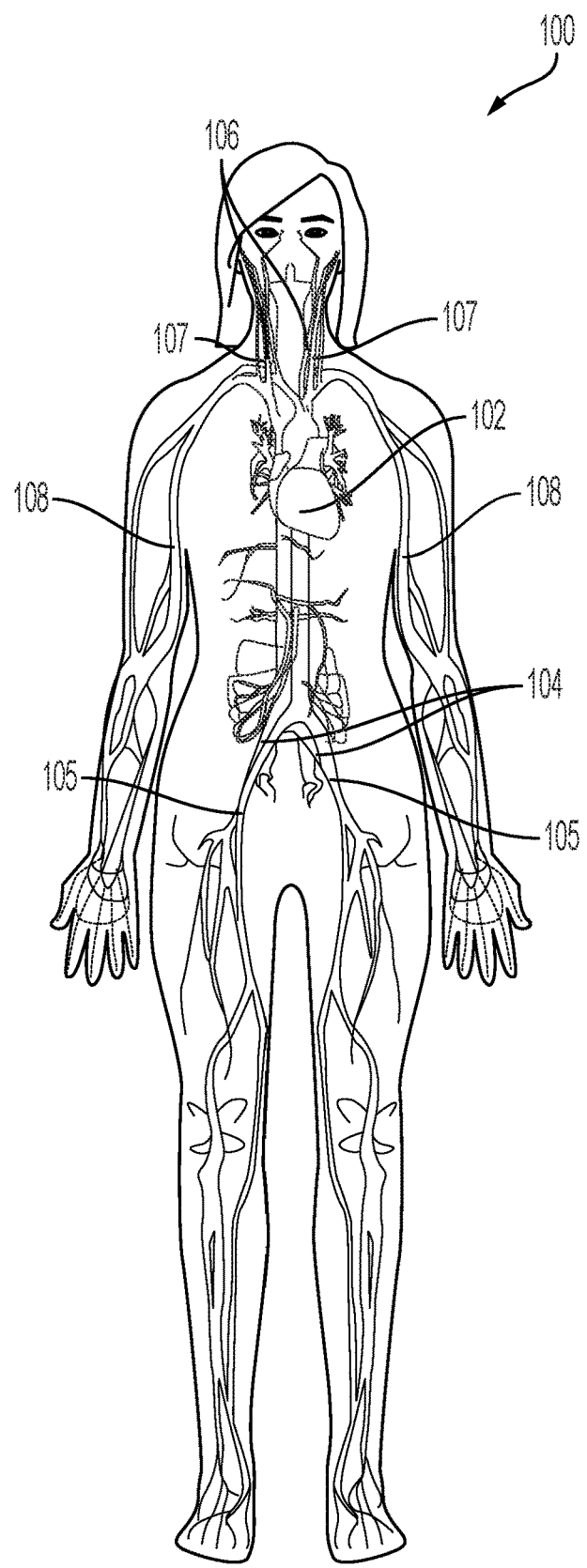
FIG. 1 illustrates and exemplary circulatory system in the human body for reference and illustration.

The figures and the summary provided herein outlines the features and technical advantages of the present disclosure. Additional features and advantages of the disclosure are provided herein. It should be appreciated by those skilled in the art that this disclosure may be readily utilized as a basis for modifying or designing other structures for carrying out the same purposes of the present disclosure. IT should also be realized by those skilled in the art that such equivalent constructions do not depart from the teachings of the disclosure as set forth in the appended claims. The novel features, which are believed to be characteristic of the disclosure, both as to its organization and method of operation, together with further purposes and advantages, will be better understood from the following description when considered in connection the accompanying figures. It is to be expressly understood, however, that each of the figures and the summary is provided for purposes of illustration and description only and is not intended as a definition of the limits of the present disclosure.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

While the following terms are believed to be well understood by one of ordinary skill in the art, the following definitions are set forth to facilitate explanation of the presently disclosed subject matter.

It is to be understood that the terminology used herein is for the purpose of describing particular embodiments only and is not intended to be limiting.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated for all purposes by reference in their entirety.

As used herein, the term "ECMO" refers to extracorporeal membrane oxygenation, which can be used in either or both contexts of the machine for performing the procedure and the procedure itself. ECMO is used to pump blood outside of a patient to a heart-lung machine that removes carbon dioxide before sending oxygen-filled blood back to the patient. Blood flows from the right side of the heart to the membrane oxygenator prior to rewarming and return. The method allows the blood to bypass the patient's heart and lungs.

As used herein, the term "direct visual" refers to the direct, physical ability of a technician to directly, visually see an object without assistance of other visualization techniques or machines. For example, the obstruction, described herein, that reduces, limits, or fully prevents "direct visual" observation of the access points to the simulated vasculature is intended to include the obstruction from the direct line of sight of the technician of the simulated artery and/or vein in which the technician is trying to access. However, exemplary embodiment that include the obstruction (i.e. not directly visual) may still include the features in which indirect visualization through ultrasound or other visualization interface with the assistance of other visualization techniques or machines is still possible.

Following long-standing patent law convention, the terms "a", "an", and "the" refer to "one or more" when used in this application, including the claims. Thus, for example, reference to "a_____" includes mixtures of one or more_____, two or more_____, and the like. When used in this specification and claims, the terms "comprises" and "comprising" and variations thereof mean that the specified features, steps or integers are included. The terms are not to be interpreted to exclude the presence of other features, steps or components.

Exemplary embodiments include a simulator that is configured to simulate physical, living patient attributes. Exemplary embodiments of the simulator may include an obstruction and/or body portion that reduces and/or eliminates the direct visual observation of one or conduits configured to approximate a portion of the vasculature of the physical, living patient.

Exemplary embodiments may therefore include a simulator, having a body (or a material, or an obstruction); a first conduit positioned within the body; a second conduit in fluid communication with the first conduit and positioned within the body; and a pump in fluid communication with the first conduit. The first conduit may be positioned on an outflow side of the pump and the second conduit is positioned on an inflow side of the pump. The first conduit and the second conduit may be the extension of the same conduit. The first conduit and the second conduit may be different conduits in fluid communication. The second conduit may have an internal cross sectional area that is larger than or equal to an internal cross sectional area of the first conduit.

The simulator may also include a reservoir in fluid communication with the pump and a one-way valve. The one way valve may be positioned to permit fluid flow in only one direction through the first conduit and the second conduit. The one way valve may be positioned in or adjacent to the second conduit and nearer the reservoir and further away from the outflow side of the pump.

The pump may be configured to supply pulsatile flow to the first conduit.

The body may include a material over at least a portion of the first conduit and the second conduit to define an access area and obstruct the direct visualization of the first conduit and the second conduit from outside of the body. The material may be configured to permit indirect visualization of the first conduit and the second conduit through ultrasound.

Exemplary embodiments may also include a method of simulating a medical procedure, including providing a simulator having a pump, a first conduit, and a second in fluid communication with the pump; and inserting an access device into the body of the simulator and into one of the first conduit and the second conduit. The method may also include obstructing a direct visualization of the first conduit and the second conduit with a body of the simulator. For example, the body of the simulator may be made of a material that obstructs the direct visibility of the conduit(s). The method may therefore include indirectly visualization the first conduit and the second conduit with ultrasound. The method may also include palpating the body of the simulator to feel a pulsatility of either the first conduit, the second conduit, or both the first conduit and the second conduit. The access device may then be coupled to an ECMO to perform a procedure on the simulator.

FIG. 1 illustrates and exemplary circulatory system in the human body for reference and illustration.

A human body 100 has a circulatory system for transporting blood around the body. The heart 102 pumps the blood through the arties of the system to deliver oxygen to various parts of the body. The arteries carry blood away from the heart and the veins carry blood toward the heart. In general, arteries carry blood that has oxygenated red blood cells, while veins carry blood that has been deoxygenated after transferring oxygen to other cells in the body.

One of the major arteries in the body is the femoral artery 104 that carries oxygenated blood to the legs. Another major artery is the carotid artery 106, which carries oxygenated blood to the head, and the brachial artery 108, which carries oxygenated blood to the arms. The circulatory system includes major veins that correspond to the major arteries in the body. Generally, the major veins are positioned proximate their counterpart arteries. For example, there is a femoral vein 105 that is located in close proximity to the femoral artery 104, and a right internal jugular vein 107 that is located in close proximity to the carotid artery 106. These veins 105, 107 carry deoxygenated blood from the various portions of the body back to the heart 102, which then pumps the deoxygenated blood to the lungs for re-oxygenation.

In many medical procedures, including ECMO, various arteries and/or veins need to be accessed by medical personnel. One problem in a cessing the femoral artery 104, carotid artery 106, and/or other arteries/veins in the body is that the arteries/veins are often protected by thick layer(s) of skin. The arteries/veins that are intended to be accessed may not be easily seen by medical personnel for access with a needle. Further, in many cases, arteries are often in close proximity to veins. However, it may be important to access the artery rather than the vein. The possible lack of visual clues for artery/vein location, as well as the proximity of a blood conduit that is carrying deoxygenated blood when oxygenated blood is desired (or vice versa), especially in time-critical procedures, illustrates several advantages of the various aspects presented in the present disclosure.

Figure 2:
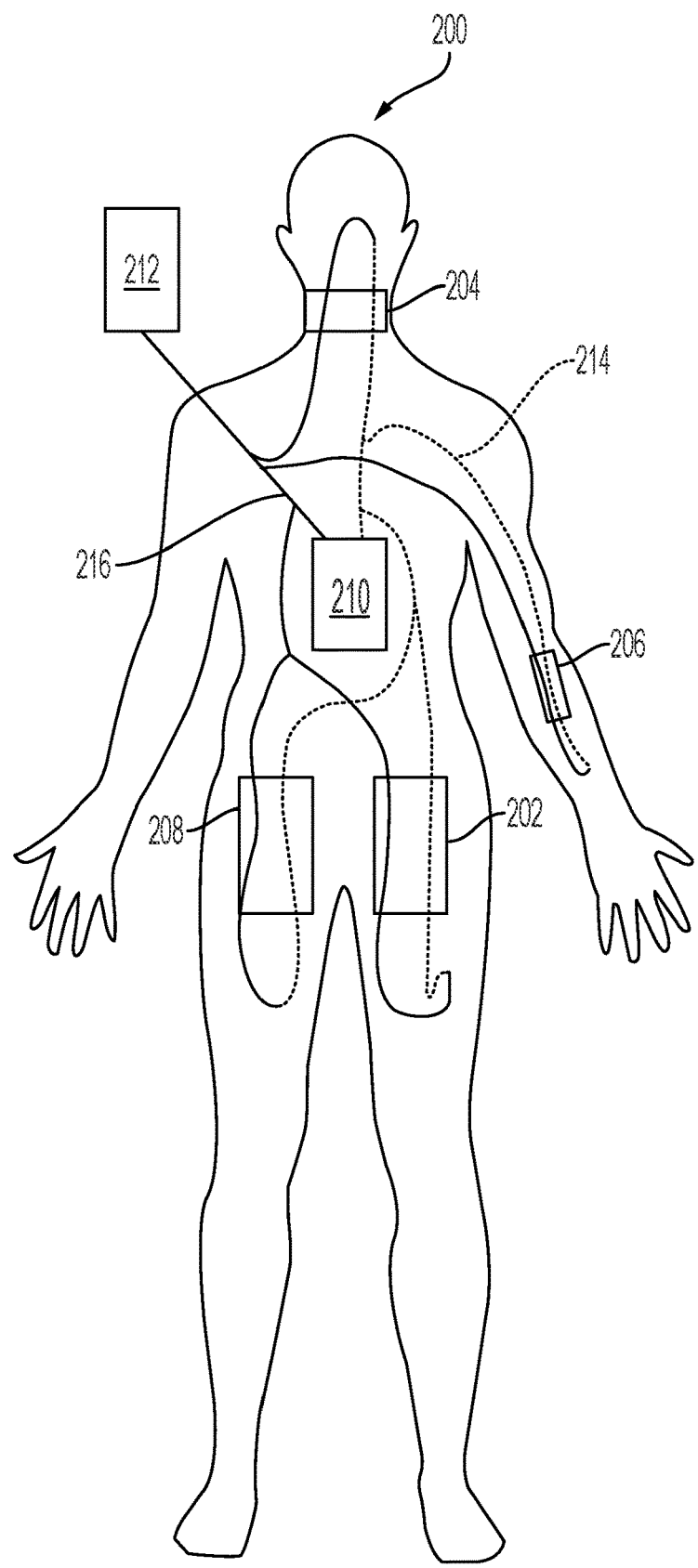
FIG. 2 illustrates a simulator in accordance with an aspect of the present disclosure.

FIG. 2 illustrates a simulator 200 in accordance with an aspect of the present disclosure. As illustrated, the simulator may include a pump 210 and conduits 214, 216 to transport fluid around the simulator 200.

In an exemplary embodiment, the simulator 200 may be the same or configured as a human, or a part of a human. The conduits 214, 216 may be positioned within the simulator that are in locations to anatomical body parts that are represented by the form of the simulator. For example, access locations for major arteries and/or veins may be positioned within the simulator that is configured as a human in approximately the same anatomical locations as that of a human. In an exemplary embodiment, the conduits 214, 216 are positioned in approximate anatomical locations at one or more access points 202, 204, 208. The access points may be positioned to approximate the access point(s) used during a procedure in which the simulator 200 is being used to approximate.

In an exemplary embodiment, the simulator 200 may include an obstruction at one or more locations. The obstruction may be configured to obscure (either partially or totally) the direct visibility of the conduits at the one or more locations. The obstruction may be over an area covering one or more access points 202, 204, 208 and/or over other areas of the simulator. In an exemplary embodiment, the obstruction may be incorporated into a skin layer of the simulator that covers all, some, or a majority of the simulator, including, for example, access point areas. The obstruction may be an opaque or translucent material to obscure the direct visibility to the conduits under (or contained within) the obstruction.

In an exemplary embodiment, the obstructions may obscure direct visibility of the conduits therein or thereunder. However, the obstruction may be configured to permit visualization through ultrasound or other imaging techniques, methods, or apparatus that are used in procedures in which the simulator is used as the patient. For example, the material of the obstruction may permit the passage of ultrasound energy and permit visualization of the conduits covered by the obstruction.

In an exemplary embodiment, the simulator 200 may include a pump 210. The pump 210 may be used to move fluid through the conduits 214, 216. In an exemplary embodiment, the system of pump(s) 210, conduit(s) 214, 216, reservoir(s) 212, and any combination thereof may create a closed fluid loop. The closed fluid loop may be used to approximate the arterial and venous portions of the cardiovascular system of a patient.

In an exemplary embodiment, the simulator 200 may be configured to create a pulsatility in the fluid system as the pump 210 moves fluid through the conduits 214, 216. In an exemplary embodiment, the pump may pulse to create pressure and/or suction to move the fluid through the conduits. In an exemplary embodiment, the simulator may include one or more one-way valve(s) in the fluid system to keep fluid moving in only one direction within the conduits.

In an exemplary embodiment, the conduits 216 that move fluid away from the pump 210 and the conduits 214 that move fluid toward the pump 210 may be configured with different fluid pressures. The simulator 200 may therefore approximate the different pressures felt between the arterial and venous systems of a patient. In an exemplary embodiment, the one or more valves (such as one-way valve) may be positioned to generate a pressure differential between the conduits 216 for moving fluid away from the pump 210 and the conduits 214 for moving fluid toward the pump 210. In an exemplary embodiment, a one-way valve is positioned closer to the reservoir or in the return line of the system than to the pump in the sending line of the system. In an exemplary embodiment, the pump may be configured to pull fluid from the reservoir 212 and push the fluid through the conduit 216 away from the pump. The position of the pumps (and any other combination of components described herein) may be used to generate or contribute to a pressure differential between the conduits 214, 216. In an exemplary embodiment, the conduits 214 for moving fluid toward the pump 210 and the conduits 216 for moving fluid away from the pump 210 may be of different sizes. For example, the internal cross sectional area of the conduit(s) 214 for moving fluid toward the pump maybe greater than or equal to the internal cross sectional area of the conduit(s) 216 for moving fluid away from the pump. In an exemplary embodiment, the lower cross sectional area of the internal conduit of the conduits may be used to increase the pressure within that portion of the system and generate a higher fluid pressure in the portion of the system that is approximating the arterial system of a patient. In an exemplary embodiment, the cross sectional area of a conduit 216 may be approximately 40-75% the cross sectional area of the conduit 214. The cross sectional area may be approximately 50-60%, or may be approximately 55%. In an exemplary embodiment, the cross section of the conduit 214, 216 may be generally circular. The inner diameter of the conduit 216 may be approximately 60-90%, and more preferable, 70-80%, or approximately 75% of the diameter of the conduit 216.

Any combination of the valve(s) placement, the pump(s) placement, the conduit size, the conduit cross sectional configuration, may be used to generate the desired pulsatility and/or differential pressure within the system. In an exemplary embodiment, the pulsatility and/or pressure differential within the system may be felt through the surface of the simulator 200. In an exemplary embodiment, a technician may palpate the skin to locate the conduit approximating the vein and/or artery and may feel the differences between the conduits, thereby approximating an actual experience working with a physical patient.

In an exemplary embodiment, the simulator 200 is configured to permit access to the one or more conduits 214, 216. The access may be at one or more access points, 204, 206, 208. As illustrated, the access points may be positioned on the simulator at major arterial locations, such as a patient's neck, arm, or upper leg. The access points may be located where the physical artery and/or vein are most easily accessible to the technician and not obstructed or minimally obstructed by muscle, skin, organs, etc. The simulator 200 may provide access to the conduits 214, 216 through needle puncture. The obstruction and/or conduits 214, 216 may therefore be configured for repeated traversal by a needle while minimizing the leakage after the needle is removed. The simulator may therefore be configured for repeated use. In an exemplary embodiment, the conduits 214, 216 are self-healing. The self-healing conduit is configured to permit access when an object (such as a needle) is inserted through a wall of the conduit but then re-seal once the object is removed from the wall, and the wall is permitted to close.

In an exemplary embodiment, the simulator 200 comprises a plurality of conduits 214, 216 coupled to a pump 210. The conduits 214, 216 and pump 210 may be in fluid communication to create a closed loop. The conduits 216 may be positioned on an exit side of the pump pushing fluid from the pump and away from the pump, while conduits 214 may be positioned on a return side of the pump in which fluid is being returned to the pump. As used here, "side" may not delineate a physical side to the pump, but instead a proximity to the pump in relation to the fluid flow into and out of (or toward and away from) the pump. In an exemplary embodiment, the return conduit(s) 214 may feed a reservoir 212, and the pump may draw fluid from the reservoir 212 before injecting into the outflow conduit(s) 216.

As illustrated, a plurality of conduits may be incorporated into the simulator 200. The plurality of conduits may create different closed loops for fluid flow. As illustrated, the different closed loops may be in fluid communication with each other or may be separated. For example, the outflow conduit 216 may branch into four branches. The different branches may be directed to different body parts, such as the neck, one or more arm(s), and one or more leg(s). As illustrated, four branches come off of the outflow conduit, thus creating four different closed loops within the simulator. However, different numbers of closed loops may be created, such as five (each arm, each leg, and the neck), four (one arm, each leg, and the neck), four (each arm, one leg, and the neck), four (each arm and each leg), three (one arm, one leg, and the neck), etc. to one closed loop. The different closed loops permits each closed loop to have an outflow conduit 216 and a return conduit 214 to simulate the arterial and venous systems.

In an exemplary embodiment, the outflow conduit(s) 216 may have a greater cross section and/or diameter than the return conduit(s) 214. For example, the outflow conduits may be approximately ½ inch outer diameter, with a ⅜ inch inner diameter, while the return conduits may be approximately ⅝ inch outer diameter and ½ inch inner diameter. In an exemplary embodiment, the conduits are made of PVC tubing. Other materials may include silicone, latex, rubber, thermoplastic polymer, vinyl, plastic, polyvinyl chloride (PVC), polyethylene, polypropylene, or combinations thereof. Exemplary materials may include a flexible material. The material and/or configuration of the conduit(s) may be selected to permit the conduits to expand and/or contract with the pulsavity of the pump. The material and/or configuration of the conduit(s) may be selected to permit self-healing and/or reduce weeping after a needle has been removed from the simulator. The material and/or configuration of the conduit(s) may be selected to create a different pressure in different portions of the conduit(s). The material and/or configuration of the conduit(s) may be selected to permit the desired placement of the conduit(s) within the simulator. For example, they may be sufficiently flexible, while reduce kinking, to create the desired closed loops in the portions of the simulator to approximate the location within the physical patient, the simulator is approximating.

In an exemplary embodiment, the conduit(s), pump(s), reservoir, and combinations thereof may be positioned within a body of the simulator and/or in fluid communication with each other. In an exemplary embodiment, the simulator may enclose any combination of the conduit(s), reservoir, and pump(s) in a material approximating a skin of a patient. The material may be a gelatin, and polydimethylsiloxane. Other materials may also be used that may approximate the mechanical properties of a patient's skin, such as the average elastic modulus and/or Poisson's ratio. The material may be selected so that the resistance encountered to insert a needle into the simulator may approximate the resistance felt by technician inserting a needle into a physical patient. The material may be selected to obstruct the direct visibility of the conduit(s) contained therein and/or thereunder. The material may be selected to permit visualization of the conduit(s) through indirect methods, such as, for example, ultrasound.

Simulator 200 may include pump 210 coupled to reservoir 212, as well as conduits 214 (representing arteries, shown in dashed lines) and 216 (representing veins, shown in solid lines) to pump fluid through the simulator 200 and access point 202 (and, optionally, access points 204, 206, 208 that may be included in simulator 200).

Figure 3:
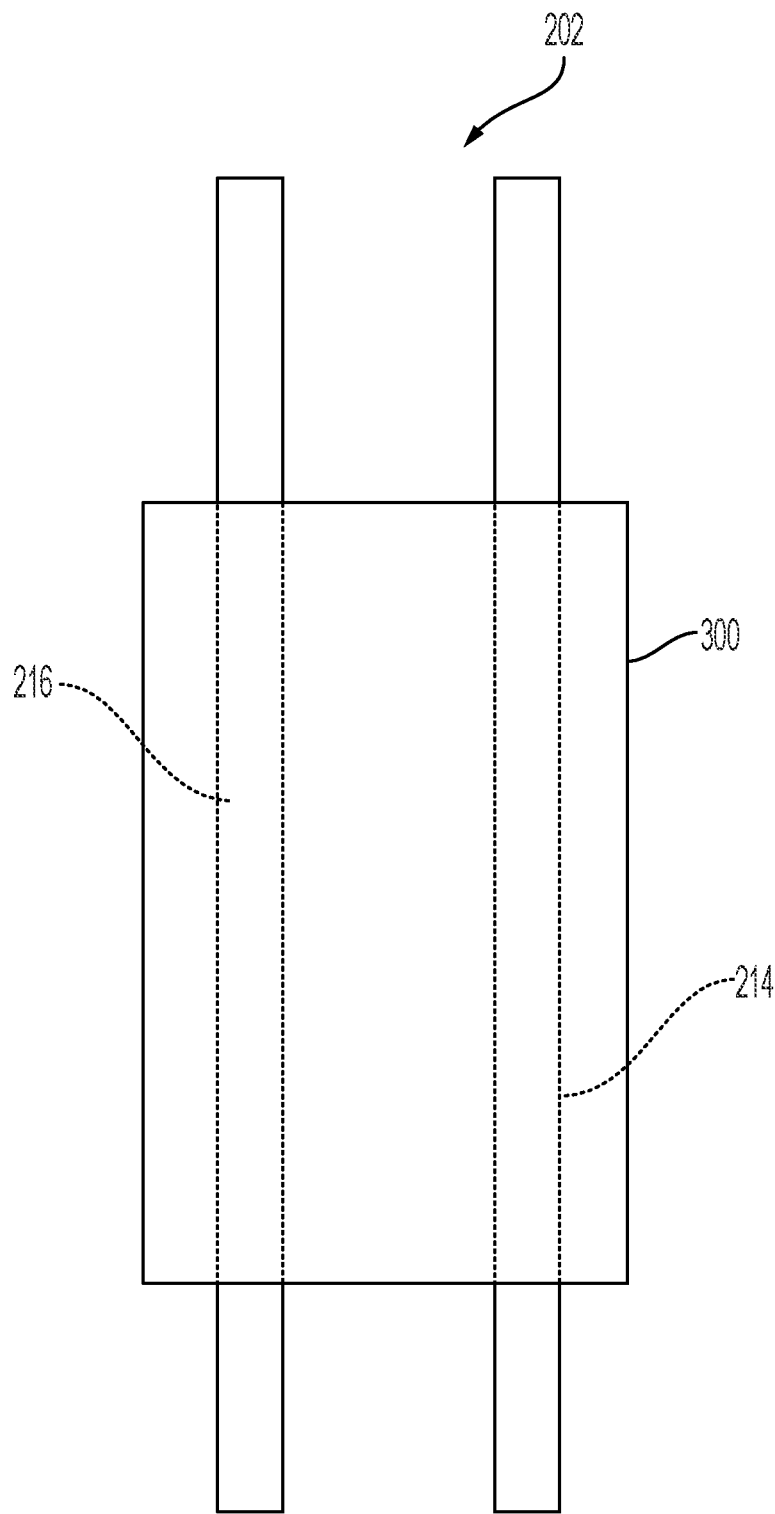
FIG. 3 illustrates an access point in accordance with an aspect of the present disclosure.

FIG. 3 illustrates an access point in accordance with an aspect of the present disclosure. Access point 202 simulates the femoral artery and femoral vein being in close proximity to each other. A substance, e.g., Smooth-On® 30 Silicone Rubber, is used within access point 202 to visually obscure the conduits 214, 216 being used to simulate the femoral artery and femoral vein. The substance may optionally have similar characteristics to human skin, e.g., resistance to piercing, flexibility, viscosity, average elastic modulus and/or Poisson's ratio, etc.

Simulator 200 may include access point 202. Simulator 200 may also comprise other access points 204, 206, and 208 and/or other access points, as desired, as illustrated in FIG. 2. As illustrated in FIG. 3, the access point 202 (which may approximate any of access points 202, 204, 206, and/or 208) provides an area to access the conduits as described herein. The access point 202 may include either or both of the conduits 214, 216. For example, as illustrated, the access point 202 may include an area in which both the outflow conduit 216 and the return conduit 214 are arranged in proximity to each other. The outflow conduit 216 and the return conduit 214 may be generally aligned. The general alignment may be such that the outflow conduit 216 is generally parallel to the return conduit 216 at the access point 202. The conduits may be considered generally parallel if the conduits run in essentially the same longitudinal direction, even if there is variation in the angular orientation between the conduits. The conduits may be considered generally parallel if the conduits are essentially positioned on opposite sides of the access area so that the conduits do not cross within the access area. As illustrated, the outflow conduit 216 and the return conduit 214 may be positioned such that either conduit may be directly access from the surface of the simulator through the access point 202 without traversing or piercing the other conduit.

The access point 202 may define an area 300 in which the conduits may be access to simulate the experience of working on a physical patient. For example, the area 300 may create an obscured or obstructed direct visibility to the conduits contained within the simulator. The conduits 214, 216 within area 300 may be indirectly visible, such as through ultrasound. The position and/or orientation and/or relative distances of conduits 214, 216 may be such as to approximate the arterial and venous system of a physical patient. In an exemplary embodiment, the area 300 may permit the pulsatility of the system to be felt on an exterior surface of the area 300.

Access point 202 (or any other access point 204, 206, 208) may include a container 218 for holding the substance, as well as constraints for coupling the conduits 214, 216 within the access point 202. Other access points 204, 206, 208 may be constructed in a similar fashion to access point 202; however, because they are in different locations in simulator 200, different containers 218, different substances, different sizes of conduits 214, 216, different orientations of conduits 214, 216, and any combination thereof may be used in order to more accurately simulate/duplicate the conditions of the human body in the locations of access points 204, 206, 208.

In order to locate the femoral artery (conduit 214), or any artery in simulator 200, the access point 202 is touched or felt by the person attempting to access the conduit 214 as opposed to conduit 216. When pump 210 pumps (in a similar fashion to the human heart), conduit 214 will have a slightly higher pressure than conduit 216, because fluid is being forward pressurized into the conduit 214, rather than being pulled through the conduit 216. This difference in pressure can be felt by the person attempting to access the conduit 214, which helps to locate both conduit 214 and 216 in access point 202. Once the location of conduit 214 is approximately known, a needle can be placed into access point 202 to access conduit 214. The needle insertion may also be guided or assisted with the use of an indirect visualization method. For example, an ultrasound may be taken of the access point 202 to visualize the conduits 214, 216. The needle may be inserted into the access conduit, such as the return conduit 214, by visualizing the needle in close proximity and insertion into the return conduit 214 on a display displaying the images taken through ultrasound of the access point 202. In an exemplary embodiment, the conduits may be colored such that the conduits if partially directly visible through the simulator may approximate the appearance of either an artery or a vein. For example, the conduits may include a reddish or bluish hue depending on whether the conduit is a return conduit (bluish) or outflow conduit (reddish).

Exemplary embodiments described herein include configurations in which the pressure is different in the outflow conduit verses the return conduit. In an exemplary embodiment, the different pressure is a gradient or gradual difference across one or both conduits. The pressure differential may be gradual along the entire length of the conduits, but may be configured such that the pressure differential is observable between the conduits at least through the portion at the access area and/or access point. The pressure differential may also be step wise different between the conduits based on the different size, orientation, relative position to the pump, relative position to the one or more valves, bending and positioning of the conduits, etc., and any combination thereof.

Figure 4:
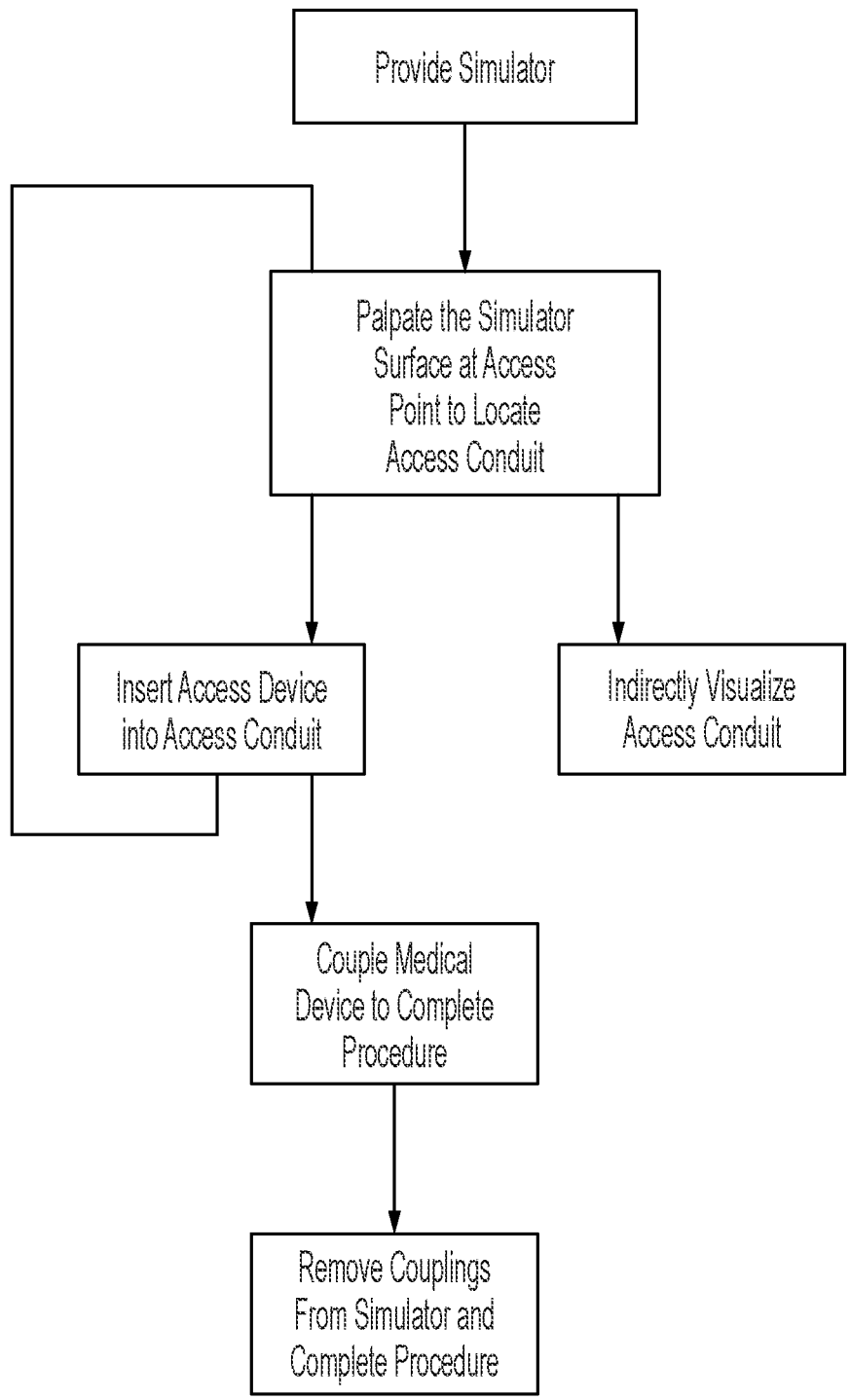
FIG. 4 illustrates an exemplary block diagram of a method in accordance with an aspect of the present disclosure.

FIG. 4 illustrates an exemplary flow diagram for a method according to embodiments described herein.

Exemplary embodiments may include methods of using the simulator according to embodiments described herein. The method may include providing a simulator as described herein including a pump, and/or one or more conduits. The method may include visual and/or tactile inspection of the access point to locate the access conduit and/or distinguish the access conduit from another conduit. For example, the access conduit may be the return conduit, while the other conduit may be the outflow conduit. The method may include palpating the access point in order to feel for the conduit and/or the pulsatility of the conduit(s) to identify and/or distinguish the access conduit from other conduits. The method may include inserting a needle or other access device into the access conduit. The method may include indirectly visualizing the access conduit and/or insertion device, such as, for example, through ultrasound. The method may include observing the pulsatile flow in the event the other conduit was inadvertently accessed instead of the access conduit. In an exemplary embodiment, other access points may be used to create a complete removal and reinsertion loop from the simulator. The process may therefore be performed again at the other access point and/or through another of the conduits of the same access point. If the correct access conduit(s) are accessed, then the simulator may be hooked up to a medical device, such as ECMO, in order to perform the procedure and simulate the entire procedure. Thereafter, the needle(s) or access devices into the simulator may be removed, the medical device disconnected, and/or the procedure terminated.

The thickness and/or firmness of the substance used to obscure conduit 214 and conduit 216 may be varied to simulate different body locations (e.g., a thicker material may be used at the femoral artery location, while a thinner material at the carotid artery location, etc.), as well as varied to simulate different types of patients (older, younger, different tissue types, etc.) For example, and not by way of limitation, thickeners or thinners may be added to the substance to change the density of the cured rubber to change an attribute of the cured rubber compound, such as any combination of the resistance to piercing, flexibility, viscosity, average elastic modulus and/or Poisson's ratio, etc. The change may be made to more accurately simulate the skin in various locations on the body; different sizes of conduits may be used to more accurately simulate the size of arteries/veins in various locations of the body, etc.

Figure 5A:
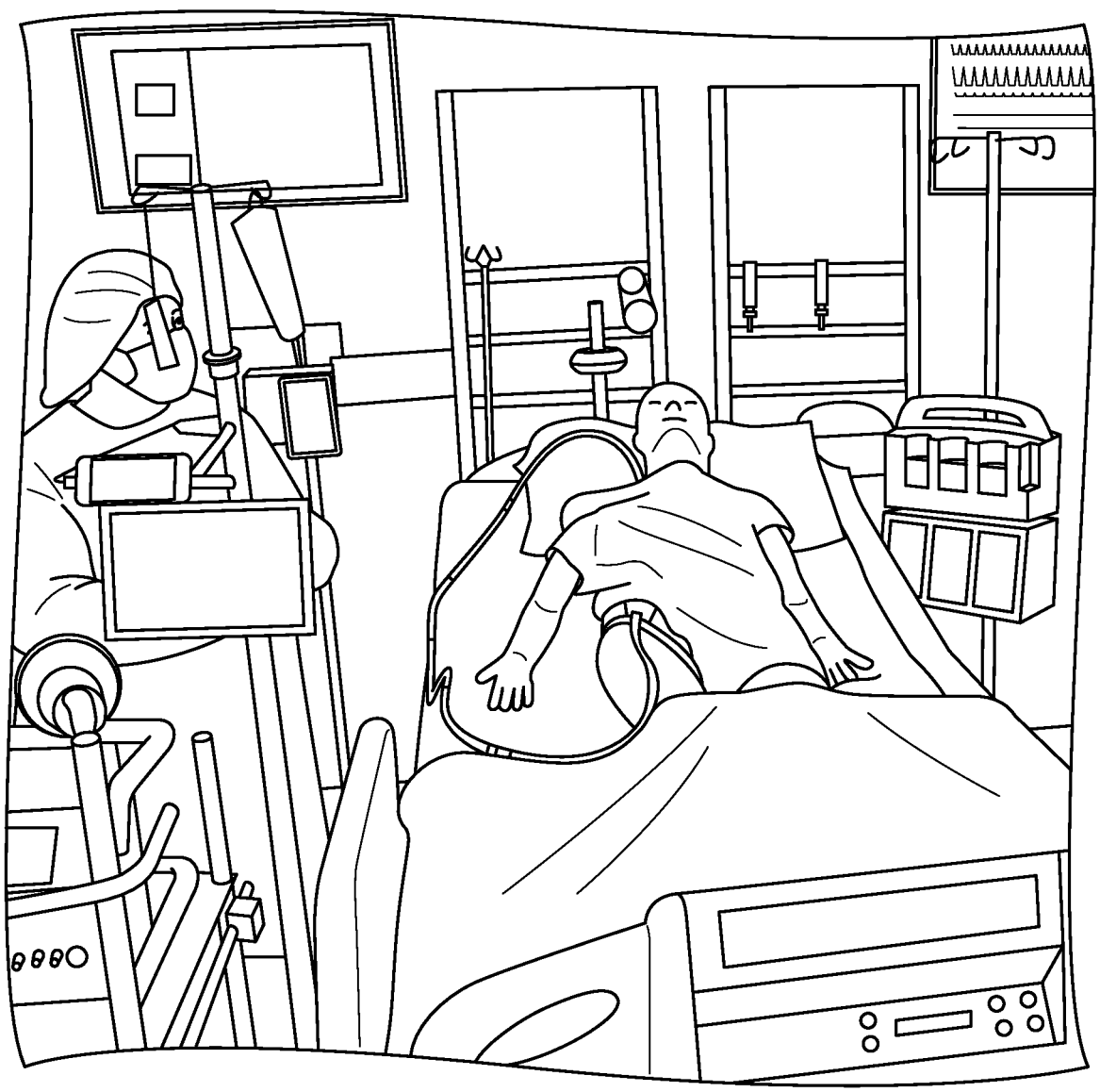
FIGS. 5A-5B illustrate exemplary simulator(s) during a simulation in accordance with aspects of the present disclosure.
Figure 5B:
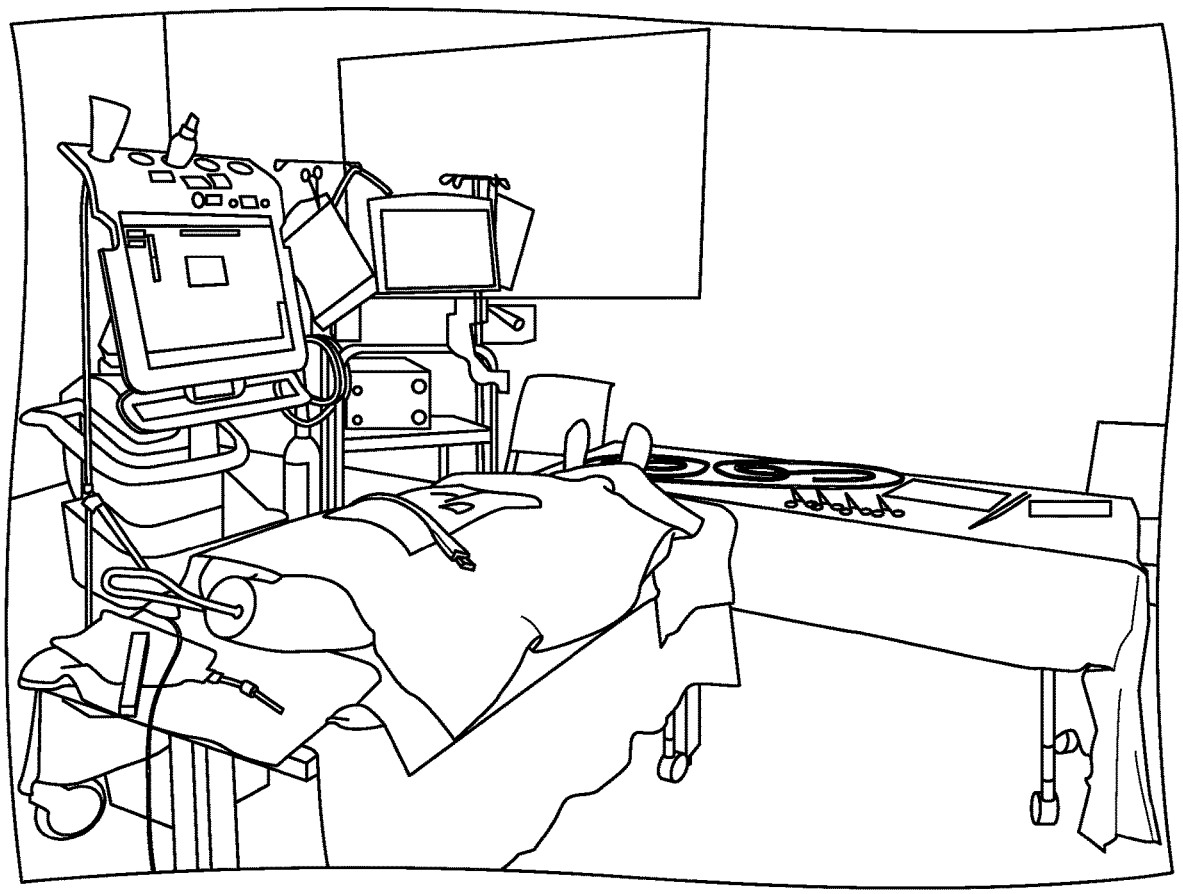

FIGS. 5A-5B illustrate exemplary simulator(s) during a simulation in accordance with aspects of the present disclosure. FIGS. 5A-5B illustrate different exemplary simulators hooked up to an ECMO in a clinical environment for use for training and/or simulation of a physical procedure on a patient.

Figure 6A:
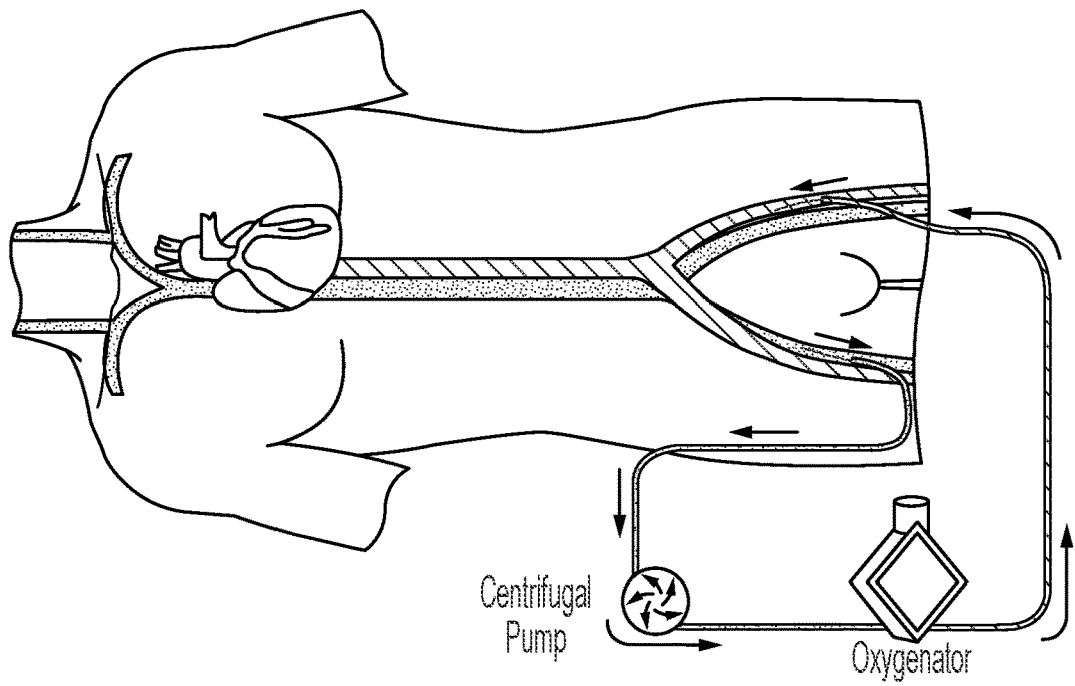
FIG. 6A illustrates an exemplary connection to a patient or simulator in accordance with aspects of the present disclosure.

FIG. 6A illustrates an exemplary connection to a patient or simulator in accordance with aspects of the present disclosure. As illustrated a processor or connection may be through two access points located on the equivalent of the lower extremity of the patient. As illustrated, the access may use the outbound conduit (i.e. arterial conduit) on one side and the inbound conduit (i.e. venous conduit) on the other side.

Figure 6B:
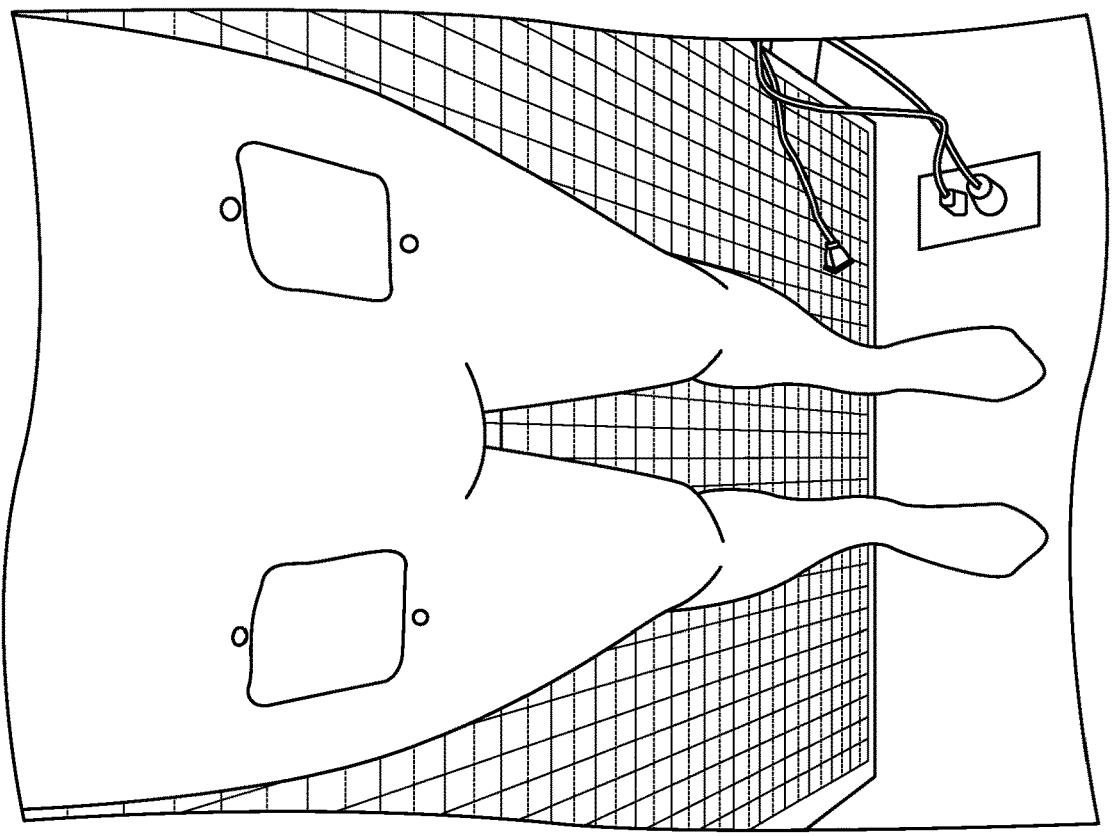
FIG. 6B illustrates a partial view of a simulator for connecting according to the connection configuration of FIG. 6A.

FIG. 6B illustrates a partial view of a simulator for connecting according to the connection configuration of FIG. 6A. As illustrated, the simulator may have just the access areas made according to embodiments described herein for access to the underlying conduits. Another portion of the simulator, or portions of the simulator outside of the access areas may be of hard plastic or other substance. The simulator preferably is lightweight for easy movement and storage. The portions of the simulator may therefore be fabricated to be cost effective, light weight, durable, or combinations thereof. The simulator may provide a general body shape approximating the patient, or a portion thereof for context and reference. However, the simulator may focus the user to the access areas.

In an exemplary embodiment, portions or all of the access areas may be removable and/or replaceable. For example, a compartment retaining a portion of the conduit(s) and substance for retaining the conduits and/or obstructing the conduits and/or for creating an approximation to skin for the simulator may be removable from a housing of the simulator. The compartment may include connections to the conduits that may remain with the rest of the simulator. The access areas may therefore be replaced after sufficient sticks or when the conduits and/or material degrades over use and/or time. As illustrated, the compartment is retained through screw connection to the rest of the simulator housing. Other connections may also be used, such as, for example, clips, snaps, rivets, hook and loop fasteners, mated interface, friction, etc.

Figure 7A:
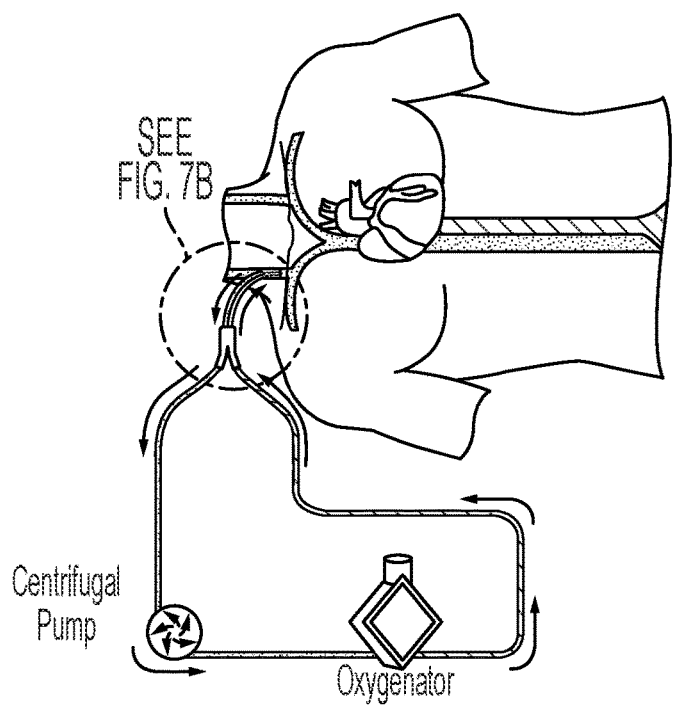
FIGS. 7-8 illustrate exemplary connection configurations for the simulator in accordance with aspects of the present disclosure.
Figure 7B:
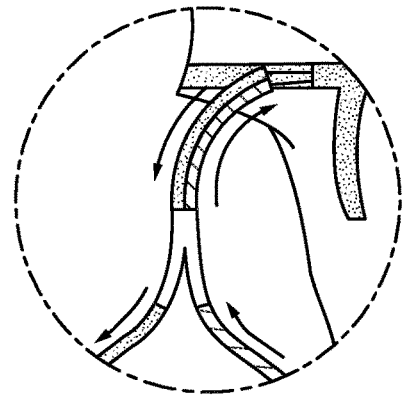
Figure 8:
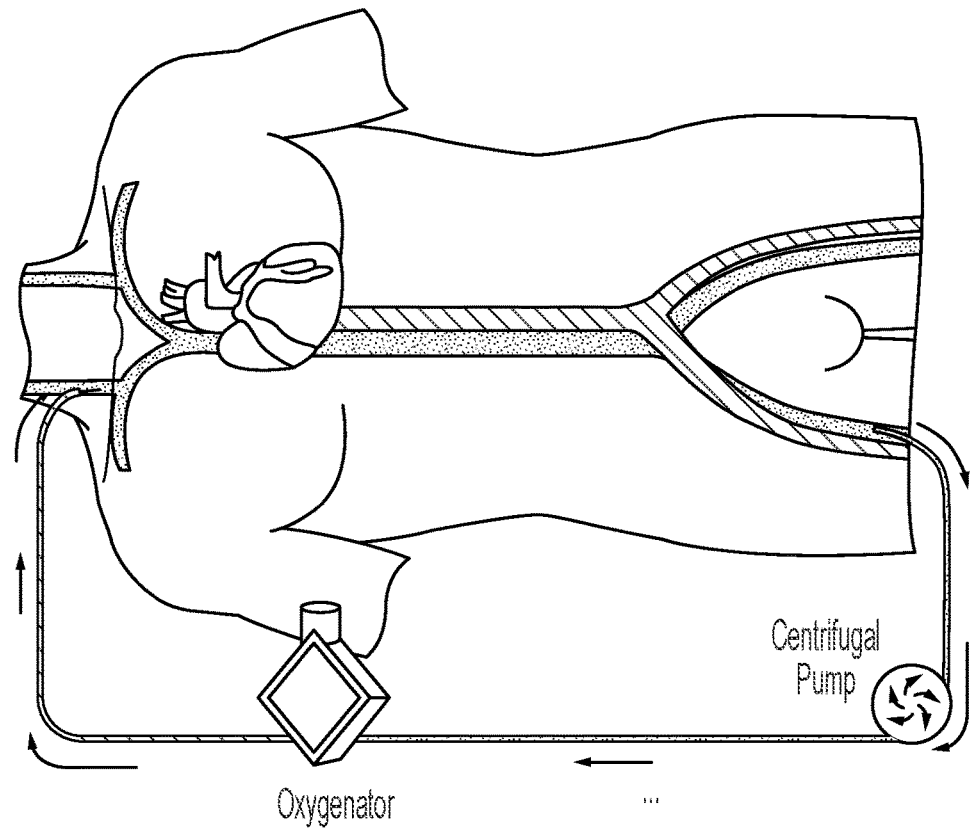

FIGS. 7-8 illustrate exemplary connection configurations for the simulator in accordance with aspects of the present disclosure. Exemplary embodiments may include different connections to the simulator through one or more of the access areas as described herein.

The pump and/or different attributes of the system may be controlled by an electronic controller and/or processor. In the present disclosure, a processor, microprocessor, and/or computer may be employed in one or more aspects of the disclosure. In an exemplary embodiment, the simulator may be controlled from a location remote from the simulator. For example, the controller may communicate with the simulator through a wired and/or wireless connection such that the parameters of the system may be set, monitored, modified, or otherwise controlled from a position remote from the simulator. This may permit a controller to control different simulation scenarios from outside of a room to create different situations that may be encountered during a physical operation. In an exemplary embodiment, the system may include a display that permits visualization of different parameters of the simulator, such as those approximating a physical patient, such as heart rate, blood pressure, etc.

The use of a processor, microprocessor, and/or computer in and of itself does not render such aspects of the present disclosure as being directed to a judicial exception to patent-eligible-subject matter, i.e., a law of nature, a natural phenomenon, or an abstract idea without significantly more. Further, aspects of the present disclosure may claim patent-eligible applications of the concepts of any law of nature, natural phenomena, and abstract ideas. Those skilled in the art will recognize that any combination of the above components, and/or any number of different components, including computer programs, peripherals, and other devices, may be used to implement the present disclosure, so long as similar functions are performed thereby.

A person of skill in the art would also recognize that embodiments of the present invention may be modified within the scope of the present description. For example, although shown and described with respect to the ECMO procedure, exemplary embodiments of the simulator provided herein may be used in other vascular access procedures and simulations.

Unless otherwise indicated, all numbers expressing quantities of ingredients, reaction conditions, measurement, dimensions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally the term "about", as used herein when referring to a measurable value such as an amount of weight, time, dose, etc. is meant to be understood by a person of skill in the art to include variations that permit the desired function and/or result. The term "about" may be based on tolerances of the manufacturing process, conventional measurement tolerances, etc. The term "about" may encompass, in one example, variations of ±15% or ±10%, in another example±5%, in another example±1%, and in yet another example±0.1% from the specified amount, if such variations are appropriate to perform the disclosed method.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure. Where a list of values is provided, it is understood that ranges between any two values in the list are also contemplated as additional embodiments encompassed within the scope of the disclosure, and it is understood that each intervening value to the tenth of the unit of the lower limit unless the context clearly dictates otherwise, between the upper and lower limit of said range and any other listed or intervening value in said range is encompassed within the disclosure; that the upper and lower limits of said sub-ranges can independently be included in the sub-ranges is also encompassed within the disclosure, subject to any specifically excluded limit.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. An extracorporeal membrane oxygenation (ECMO) simulator, comprising:
   a housing operable to simulate at least a portion of a patient during an ECMO training procedure wherein the housing is configurable to include a torso;
   a first conduit having a first internal cross-sectional area positioned within the housing;
   a second conduit having a second internal cross-sectional area 40-75% of the first internal cross-sectional area positioned within the housing in fluid communication with the first conduit;
   a first palpatable access point configurable to engage the first conduit and operable to simulate a first vein and receive a first cannula;

a second palpatable access point configurable to engage the second conduit and operable to simulate an artery and receive a second cannula;

an obstruction operable to obscure direct visibility of the first conduit or second conduit at the first palpatable access point or the second palpatable access point wherein the obstruction has a thickness selected to simulate a target body location; and a pump in fluid communication with the first conduit operable to provide a pulsatile fluid flow through the first conduit, wherein the first conduit is positioned on an outflow side of the pump and the second conduit is positioned on an inflow side of the pump, wherein the pump is configured to facilitate a pressure difference between the first conduit at the first palpatable access point and the second conduit at the second palptable access point, wherein the pressure difference is operable to be felt by a person attempting to access the first conduit or the second conduit.

2. The extracorporeal membrane oxygenation simulator of claim 1, further comprising a reservoir in fluid communication with the pump and a one-way valve, wherein the one way valve is positioned to permit fluid flow in only one direction through the first conduit and the second conduit.

3. The extracorporeal membrane oxygenation simulator of claim 2, wherein the one way valve is positioned in or adjacent to the second conduit and nearer the reservoir and further away from the outflow side of the pump.

4. The extracorporeal membrane oxygenation simulator of claim 1, wherein the obstruction is configured to permit indirect visualization of the first conduit and the second conduit through ultrasound.

5. The extracorporeal membrane oxygenation simulator of claim 1, wherein the pressure difference is caused by fluid being forward pressurized into the first conduit and pulled through the second conduit.

6. The extracorporeal membrane oxygenation simulator of claim 1, wherein the pressure difference is a gradient across the first conduit and the second conduit.

7. A method of simulating an extracorporeal membrane oxygenation procedure, comprising:

providing an extracorporeal membrane oxygenation simulator having a housing, a pump, a first conduit having a first internal cross-sectional area positioned within the housing, and a second conduit having a second internal cross-sectional area 40-75% of the first internal cross-sectional area positioned within the housing, an obstruction operable to obscure direct visibility of the first conduit or second conduit at a first palpatable access point or a second palpatable access point wherein the obstruction has a thickness selected to simulate a target body location and the first conduit and the second conduit are in fluid communication with the pump, and wherein the housing is operable to simulate at least a portion of a patient during a training procedure and includes a torso;

palpating the first palpatable access point to identify a first insertion location;

inserting a first cannula into the first insertion location of the extracorporeal membrane oxygenation simulator;

palpating the second palpatable access point to identify a second insertion location;

inserting a second cannula into the second insertion location of the extracorporeal membrane oxygenation simulator;

operating the pump to provide a pulsatile fluid flow manually detectable from an exterior surface of the housing;

positioning the first conduit on an outflow side of the pump and the second conduit on an inflow side of the pump; and facilitating a pressure difference between the first conduit at the first palpatable access point and the second conduit at the second palptable access point, wherein the pressure difference is manually detectable from an exterior surface of the housing.

8. The method of claim 7, further comprising:
obstructing a direct visualization of the first conduit and the second conduit of the extracorporeal membrane oxygenation simulator.

9. The method of claim 8, further comprising:
visualizing indirectly the first conduit and the second conduit with ultrasound.

10. The method of claim 9, further comprising:
manually palpating the body of the extracorporeal membrane oxygenation simulator to feel a pulsatility of either the first conduit, the second conduit, or both the first conduit and the second conduit.

11. The method of claim 9, further comprising:
coupling the access device to an ECMO device; and
performing a procedure on the extracorporeal membrane oxygenation simulator.

12. The method of claim 7, wherein the pressure difference is caused by fluid being forward pressurized into the first conduit and pulled through the second conduit.

13. The method of claim 7, wherein the pressure difference is a gradient across the first conduit and the second conduit.

14. A system for extracorporeal membrane oxygenation (ECMO) simulation, comprising:

a housing operable to simulate at least a portion of a patient during an ECMO training procedure wherein the housing is configurable to include a torso;

a first conduit having a first internal cross-sectional area positioned within the housing;

a second conduit having a second internal cross-sectional area positioned within the housing in fluid communication with the first conduit;

a first palpatable access point configurable to engage the first conduit and operable to simulate a first vein and receive a first cannula;

a second palpatable access point configurable to engage the second conduit and operable to simulate an artery and receive a second cannula;

an obstruction operable to obscure direct visibility of the first conduit or second conduit at the first palpatable access point or the second palpatable access point wherein the obstruction has a thickness selected to simulate a target body location; and a pump in fluid communication with the first conduit operable to provide a pulsatile fluid flow through the first conduit, wherein the first conduit is positioned on an outflow side of the pump and the second conduit is positioned on an inflow side of the pump, wherein the pump is configured to facilitate a pressure difference between the first conduit at the first palpatable access point and the second conduit at the second palptable access point, wherein the pressure difference is operable to be felt by a person attempting to access the first conduit or the second conduit.

15. The system of claim 14, further comprising a reservoir in fluid communication with the pump and a one-way valve, wherein the one way valve is positioned to permit fluid flow in only one direction through the first conduit and the second conduit.

16. The system of claim 15, wherein the one way valve is positioned in or adjacent to the second conduit and nearer the reservoir and further away from the outflow side of the pump.

17. The system of claim 14, wherein the obstruction is configured to permit indirect visualization of the first conduit and the second conduit through ultrasound.

18. The system of claim 14, wherein the second conduit has a second internal cross-sectional area that is 40-75% of the first internal cross-sectional area.

19. The system of claim 14, wherein the pressure difference is caused by fluid being forward pressurized into the first conduit and pulled through the second conduit.

20. The system of claim 14, wherein the pressure difference is a gradient across the first conduit and the second conduit.

* * * * *